Patented Oct. 17, 1939

2,176,437

UNITED STATES PATENT OFFICE 2,176,437

DYESTUFFS OF THE ANTHRAQUINONE SERIES

Ernst Runne and Ludwig Wilhelm Berlin, Frankfort-on-the-Main, Germany, assignors to General Aniline Works, Inc., New York, N. Y., a corporation of Delaware No Drawing. Application March 4, 1938, Serial No. 193,922. In Germany March 6, 1937

5 Claims. (Cl. 260—377)

The present invention relates to dyestuffs of the anthraquinone series.

We have found that dyestuffs of the following general constitution:

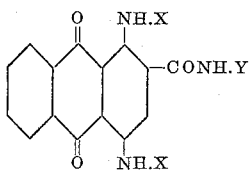

wherein Y and one of the X's stand for a hydroxy alkyl group and the other X stands for hydrogen, alkyl or a hydroxy alkyl group are comparatively highly soluble in water and are particularly suitable for the dyeing and uniform penetration of closely woven acetate artificial silk, for instance, bark-like crepe. By this uniform penetration and the intense shades of the dyeings simltaneously obtained the new dyestuffs are distinguished from the known dyestuffs of similar constitution. The dyestuffs of the above general formula have not yet been described in literature. They may be made in various manners.

The new dyestuffs may for instance be obtained by causing an anthraquinone-2-carboxylic acid halide containing in 1-position a substituent exchangeable for an amine radical to react with a primary aliphatic amine or ammonia so as to form a derivative containing similar or different amine radicals, halogenating the said derivative and causing the 4-halogenanthraquinone derivative thus produced to react further with a primary aliphatic amine or ammonia, care being taken by the use of a hydroxyalkyl amine that the final substance contains at least two hydroxyalkyl groups one of which is present in the carboxyamide group.

The new dyestuffs may also be obtained by causing an anthraquinone-2-carboxylic acid halide containing in 1- and 4-position a substituent exchangeable for an amine radical to react with a primary aliphatic amine or with ammonia so as to form a derivative containing similar or different amine radicals, care being taken by the use of hydroxyalkyl amines that the final substance contains at least two hydroxyalkyl groups one of which is present in the carboxyamide group.

The new dyestuffs may also be made by causing an anthraquinone-2-carboxylic acid halide containing in 1-position a primary amino group or the radical of an aliphatic amine to react with a primary hydroalkyl amine so as to form a derivative containing similar or different amine radicals, halogenating the product and causing the 4-halogenanthraquinone derivative thus obtained to react further with a primary aliphatic amine or ammonia and taking care by the use of hydroxyalkyl amines that the final substance contains at least two hydroxyalkyl groups one of which stands in the carboxyamide group.

Another method of making the new dyestuffs consists in causing an anthraquinone-2-carboxylic acid halide containing in 1-position an amino-group or the radical of an aliphatic amine and in 4-position a substituent exchangeable for an amine radical to react with an aliphatic amine or with ammonia so as to form a derivative containing similar or different amine radicals and taking care by the use of hydroxyalkyl amines that the final substance contains at least two hydroxyalkyl groups one of which is present in the carboxyamide group.

Another way of producing the new dyestuffs consists in causing an anthraquinone-2-carboxylic acid halide of the general formula:

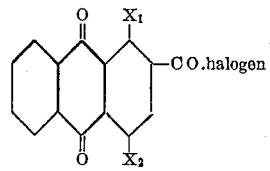

wherein $X_1$ stands for the radical of a primary hydroxylalkylamine and $X_2$ stands for a nitrogroup or an acylamino group to react with a primary hydroxyalkylamine so as to form a derivative with similar or different amine radicals and reducing the nitro-group or saponifying the acylamino-group in 4-position to form the aminogroup.

Among the amines which may be used for carrying out the processes described above the most important are: ammonia, methylamine, ethylamine, 2-amino-ethanol-(1), 3-amino-propanol-(1), or the like.

The following examples serve to illustrate the invention but they are not intended to limit it thereto, the parts being by weight:

1a. 40 parts of 1-chloranthraquinone-2-carboxylic acid chloride melting at 213° C. are introduced into 350 parts of aminoethanol and the mixture is heated for a short time to boiling. The red solution is allowed to cool; it is mixed with water, the red precipitate obtained is filtered with suction and washed with water. The 1-hydroxyethylamino-anthraquinone-2-carboxylic hydroxyethylamide, which is purified by reprecipitation from alcohol is thus obtained in a good yield. It melts at 218° C.–220° C. Instead of 1-chloranthraquinone-2-carboxylic acid chloride there may be used with the same success 1-nitro-anthraquinone-2-carboxylic acid chloride.

1b. 33 parts of the product made as described in 1a are suspended in 280 parts of concentrated hydrochloric acid; the suspension is gradually mixed with a solution of 17 parts of bromine and a trace of iodine in 60 parts of concentrated hydrochloric acid at room temperature and the mixture is kept at 20° C.–25° C. for about 2 to 3 hours. Water is added and the red solid precipitate is filtered with suction and dried. The 1-hydroxyethylamino-4-bromanthraquinone-2 - carboxylic-hydroxyethyl-amide melts at 227° C. after recrystallization from nitrobenzene.

1c. 10 parts of the brominated product obtained as described in 1b are heated on a boiling water bath for about three quarters of an hour with ½ part of copper acetate and 60 parts of aminoethanol: during the heating operation the solution which is at first red becomes violet and then blue. The purely blue solution is allowed to cool and is then mixed with sodium chloride solution whereby the dyestuff is precipitated in an almost pure state in the form of blue flakes. By recrystallization from acetone the pure 1.4-bis-hydroxyethylaminoanthraquinone-2-carboxylic hydroxy-ethylamide is obtained. It melts at 135° C. It is readily soluble in hot water and, after addition of salt to the solution, closely woven acetate artificial silk is dyed pure blue shades intensely and with uniform penetration.

The same dyestuff may also be made from 1.4-dichloranthraquinone-2-carboxylic acid chloride.

2a. 266 parts of 1-amino-anthraquinone-2-carboxylic acid are made into a paste with 1000 parts of water, 300 parts of concentrated hydrochloric acid are added and the mixture is brominated at 70° C.–80° C. for about 4 hours with 160 parts of bromine in 100 parts of concentrated hydrochloric acid. The crude product is precipitated with ice water, dissolved in a solution of sodium carbonate and purified by filtration and reprecipitation with hydrochloric acid. The pure product is a red powder and melts at 316° C.

2b. 10 parts of the finely divided 1-amino-4-bromanthraquinone-2-carboxylic acid made as described in 2a are suspended in 80 parts of nitrobenzene and the suspension is heated at 100° C. with 15 parts of thionyl chloride until hydrochloric acid is no longer evolved. After cooling, the product is filtered with suction and washed with a small quantity of ether or acetone. The acid chloride melting at 218° C. is thus obtained.

2c. 10 parts of 1-amino-4-bromanthraquinone-2-carboxylic acid chloride, 100 parts of aminoethanol and 0.25 part of copper acetate are heated together on a boiling water bath for about 1 hour until the solution is pure blue. The product is precipitated with dilute sodium chloride solution, filtered with suction and the residue is recrystallized from acetone. The blue dyestuff which melts at 172° C. is comparatively readily soluble in hot water. After addition of ammonium chloride or sodium sulfate to the solution, acetate artificial silk bark-like crepe is dyed therein with good penetration very intense and clear blue shades of very good fastness to light.

The same dyestuff may be obtained from 1-amino-anthraquinone-2-carboxylic acid chloride by transforming it into the 2-carboxylic hydroxyethylamine and by bromination and substitution.

Similar dyestuffs are obtained by using instead of aminoethanol, 3-aminopropanol-(1) or 3-aminopropanediol-(1.2).

3. 10 parts of 1-methylamino-4-bromanthraquinone-2-carboxylic acid chloride (melting at 153° C.–154° C. with frothing obtained from 1-methylamino-anthraquinone-2 - carboxylic acid (melting at 237° C.–238° C. with frothing), according to the process analogous to that described in 2a and 2b, are introduced at room temperature into 10 parts of amino-ethanol and 200 parts of water; the mixture is heated and kept for a short time at 90° C.–95° C., filtered with suction and the solid matter is washed with water until neutral.

20 parts of the red 1-methylamino-4-bromanthraquinone-2-carboxylic acid hydroxyethylamide (melting at 206° C.–207° C.) are heated for several hours at 90° C.–95° C. with 12.5 parts of amino-ethanol and 1 part of copper acetate in n-butanol. After cooling, the whole is filtered with suction and the solid matter is washed with water until neutral. The blue crystals obtained may be recrystallized, for instance, from n-butanol; they melt at 207° C.–208° C. On acetate artificial silk the dyestuff yields greenish-blue shades.

The dyestuff having an ethylamino group in 1-position of the anthraquinone instead of a methylamino group yields similar shades.

We claim:

1. The compounds of the general formula:

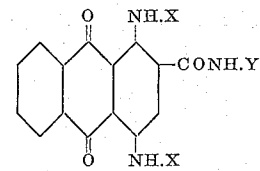

wherein Y and one of the X's represents a hydroxy alkyl group and the other X represents a member of the group consisting of hydrogen, alkyl and hydroxy alkyl said compounds being dyestuffs of comparatively high solubility which dye closely woven acetate silk uniform penetration even and intense shades.

2. The compounds of the general formula:

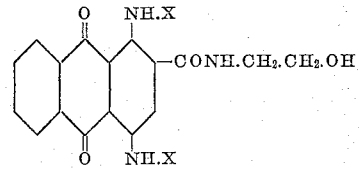

wherein one of the X's represents the group —$CH_2.CH_2.OH$ and the other X a member of the group consisting of hydrogen, methyl and —$CH_2.CH_2.OH$, said compounds being dyestuffs of comparatively high solubility, which dye closely woven acetate silk with uniform penetration even and intense shades.

3. The compound of the formula:

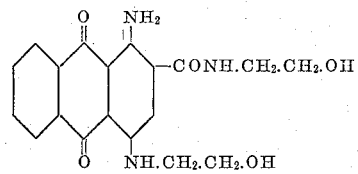

being a blue dyestuff which melts at 172° C., is comparatively readily soluble in hot water and dyes acetate silk bark-like crepe with good penetration very intense and clear blue shades of very good fastness to light.

4. The compound of the following formula:

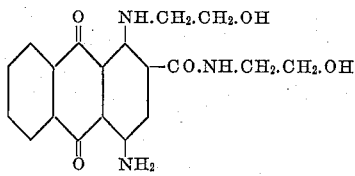

being a dyestuff which yields violet shades.

5. The compound of the following formula:

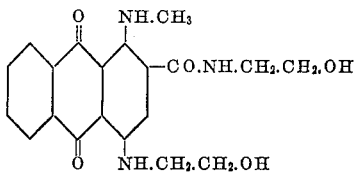

being a dyestuff melting at 207° C.–208° C. and yielding on acetate silk greenish-blue shades.

ERNST RUNNE.
LUDWIG WILHELM BERLIN.